(12) United States Patent
Kim et al.

(10) Patent No.: US 8,404,798 B2
(45) Date of Patent: Mar. 26, 2013

(54) POLYARYLENE ETHER AND METHOD FOR PREPARING THE SAME

(75) Inventors: Yong Tae Kim, Uiwang-si (KR); Jin Kyu Kim, Uiwang-si (KR); Bok Nam Jang, Uiwang-si (KR); Joong In Kim, Uiwang-si (KR); Young Jun Kim, Suwon-si (KR); Ji Heung Kim, Suwon-si (KR); Chang Jae Lee, Suwon-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/324,127

(22) Filed: Dec. 13, 2011

(65) Prior Publication Data

US 2012/0309927 A1 Dec. 6, 2012

(30) Foreign Application Priority Data

Jun. 3, 2011 (KR) .......................... 10-2011-0054212
Jun. 3, 2011 (KR) .......................... 10-2011-0054213

(51) Int. Cl.
*C08G 64/00* (2006.01)
*C08G 63/02* (2006.01)

(52) U.S. Cl. ...................................................... 528/215

(58) Field of Classification Search ................... 528/215
See application file for complete search history.

(56) References Cited

U.S. PATENT DOCUMENTS 3,134,753 A * 5/1964 Kwiatek ....................... 528/212
4,085,124 A * 4/1978 Rutledge ....................... 552/304

* cited by examiner

*Primary Examiner* — Terressa Boykin
(74) *Attorney, Agent, or Firm* — Summa, Additon & Ashe, P.A.

(57) ABSTRACT

Polyarylene ether is polymerized using a dissolving agent including anisole, wherein the polyarylene ether includes about 1 to about 3,000 ppm of anisole.

23 Claims, No Drawings

POLYARYLENE ETHER AND METHOD FOR PREPARING THE SAME

CROSS-REFERENCE TO RELATED APPLICATIONS

This application claims priority under 35 USC Section 119 to and the benefit of Korean Patent Application No. 10-2011-0054212, filed Jun. 3, 2011, and Korean Patent Application No. 10-2011-0054213, filed Jun. 3, 2011, the entire disclosure of each of which is incorporated herein by reference.

FIELD OF THE INVENTION

The present invention relates to polyarylene ether and a method for preparing the same.

BACKGROUND OF THE INVENTION

Polyarylene ether has excellent heat resistance and can be blended with a thermoplastic resin composition containing an aromatic vinyl resin to impart heat resistance thereto.

Polyarylene ether can be prepared using a combination of manganese salt and an amine compound as a catalyst in the presence of oxygen. Manganese salt does not decline in catalytic activity due to water generated in the polymerization. Manganese salt, however, can impart a color and can decrease thermal stability if it remains in the polymerized polyarylene ether.

Polyarylene ether can also be produced using a combination of copper salt and an amine compound as a catalyst. One such method uses acetonitrile, chloroform, toluene, benzene, pyridine, ethylbenzene, cyclohexane, xylene, chlorobenzene, nitrobenzene, 1,2-dichlorobenzene, or water as a solvent. Toluene or chloroform is generally used.

However, when toluene is used as a solvent, a violent reaction occurs in the initial stage of polymerization, making it difficult to adjust heat of polymerization. It is also difficult to deal with toluene due to the low flash point of toluene. Further, if water is generated during polymerization, a water layer is separated due to low solubility of water and a copper-amine catalyst transfers to the separated water layer, thereby reducing catalytic activity and resulting in a longer polymerization time and a lower yield. In order to solve these problems, a desiccant (MgSO4) is used to remove generated water, surfactants are added, or an amphiprotic solvent such as alcohol is added to prevent the decline in catalytic activity.

The use of chloroform as a solvent can be dangerous and environmentally undesirable. Further, chloroform can generate a large amount of byproducts such as diphenyl quinone, as compared with aromatic solvents (such as benzene and toluene, among others).

Thus, there is a need for a new method for preparing polyarylene ether, which does not harm humans, provides stability in treatment and reaction, and does not decrease catalytic activity.

SUMMARY OF THE INVENTION

The present invention provides a method for preparing polyarylene ether. The method can be safe, can be environmentally friendly, can have stability in treatment and reaction, can allow ready adjustment of heat of polymerization, and can minimize or eliminate the deterioration of catalytic activity by water generated during polymerization.

The method uses a dissolving agent containing anisole and optionally a non-solvent to prepare polyarylene ether. The non-solvent may be a solvent that is insoluble in the polyarylene ether and soluble in a catalyst used to prepare the polyarylene ether. Examples of the non-solvent may include without limitation C1 to C4 alcohols, water, ketones, and the like, and combinations thereof.

The method can allow production of polyarylene ether having a molecular weight that can be adjusted depending on the ratio of the anisole and the non-solvent. The method may also provide high yields of the polyarylene ether.

The present invention also provides polyarylene ether prepared by the method. In exemplary embodiments, the polyarylene ether can include about 1 to about 3,000 ppm of anisole. In other exemplary embodiments, the polyarylene ether includes about 1 to about 3,000 ppm of anisole and about 1 to about 3,000 ppm of a non-solvent.

The polyarylene ether may also include a copper salt catalyst.

In exemplary embodiments, the polyarylene ether may have a weight average molecular weight of about 15,000 to about 50,000 g/mol. In other exemplary embodiments, the polyarylene ether may have a weight average molecular weight of about 20,000 to about 70,000 g/mol. In other exemplary embodiments, the polyarylene ether may have a weight average molecular weight of about 50,000 to about 300,000 g/mol.

The method for preparing polyarylene ether can include reacting a monohydroxy aromatic compound in the presence of a catalyst, oxygen, and a dissolving agent, wherein the dissolving agent includes anisole.

In exemplary embodiments, the catalyst may include a copper salt. In other exemplary embodiments, the catalyst may include a complex catalyst containing a copper salt and an amine compound.

The monohydroxy aromatic compound may be represented by Formula 1:

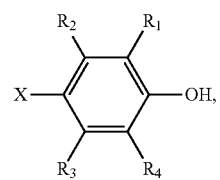

[Formula 1]

wherein X is hydrogen or halogen; and $R_1$, $R_2$, $R_3$ and $R_4$ are the same or different and are each independently hydrogen, halogen, C1 to C6 alkyl, or C6 to C12 aryl.

In exemplary embodiments, the method may include preparing a reactant mixture by mixing a monohydroxy aromatic compound, copper salt, and anisole; and adding an amine compound to the reactant mixture in the presence of oxygen.

In other exemplary embodiments, the method may include preparing a reactant mixture by mixing copper salt, an amine compound, and a dissolving agent including anisole; and adding a monohydroxy aromatic compound to the reactant mixture in the presence of oxygen. In this embodiment, the monohydroxy aromatic compound may be dissolved in the dissolving agent including anisole and then added to the reactant mixture in the presence of oxygen.

The dissolving agent may include anisole alone or may include a mixture solution of anisole and a non-solvent. The weight ratio of the anisole to the non-solvent in the mixture solution may be about 7:3 to about 3:7.

The reactant mixture may include the dissolving agent in an amount of about 70 to about 95 wt %, for example, about 75 to about 90 wt %, based on the total weight of the reactant mixture.

The reactant mixture may include anisole in an amount of about 70 to about 90 wt %, based on the total weight of the reactant mixture.

A base having a hydroxyl group may be added to the reactant mixture at a mole ratio of the base having a hydroxyl group to the copper salt of about 0 to 3.

Examples of the amine compound may include without limitation primary amines, secondary amines, tertiary amines, and combinations thereof.

The present invention further provides polyarylene ether prepared by reaction of a monohydroxy aromatic compound in the presence of a catalyst and a dissolving agent. In this embodiment, the solubility of the catalyst in the dissolving agent is higher than the solubility of the catalyst in water.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A method for preparing polyarylene ether according to the present invention includes reacting a monohydroxy aromatic compound in the presence of a catalyst, oxygen, and a dissolving agent, wherein the dissolving agent includes anisole.

As used herein, the term "dissolving agent" is defined as a solvent which may dissolve a catalyst used in the polymerization of polyarylene ether and has a higher ability to dissolve the catalyst than water.

In one embodiment, the method may include preparing a reactant mixture by mixing a monohydroxy aromatic compound, copper salt, and anisole; and adding an amine compound to the reactant mixture in the presence of oxygen.

In another embodiment, the method may include preparing a reactant mixture by mixing copper salt, an amine compound, and a dissolving agent; and adding a monohydroxy aromatic compound to the reactant mixture in the presence of oxygen. The dissolving agent may include anisole alone or a solution of anisole and a non-solvent.

The monohydroxy aromatic compound may be represented by Formula 1:

[Formula 1]

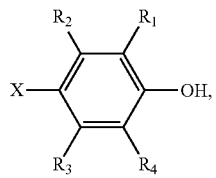

wherein X is hydrogen or halogen; and $R_1$, $R_2$, $R_3$ and $R_4$ are the same or different and are each independently hydrogen, halogen, C1 to C6 alkyl, or C6 to C12 aryl, such as phenyl.

Examples of the monohydroxy aromatic compound may include without limitation 2,6-dimethylphenol, 2,3,5-trimethylphenol, 2,3,6-trimethylphenol, and the like, and combinations thereof.

In one embodiment, the catalyst may be a complex catalyst including a copper salt and an amine compound. Examples of the copper salt may include without limitation Cu(I) and Cu(II) compounds, for example, copper halides (such as CuCl, CuBr, CuI, $CuCl_2$, and $CuBr_2$) and hydrates thereof ($CuCl_2.2H_2O$), copper nitrates and hydrates thereof, copper sulfates and hydrates thereof, soluble intermediates obtained by reaction of copper oxide (CuO) with HCl or HBr, copper acetates and hydrates thereof, copper chloride-ammonium chloride (($NH_4)_2CuCl_4$), and the like, and combinations thereof.

In exemplary embodiments, the copper salt can include copper (I) chloride (CuCl), copper (II) chloride ($CuCl_2$), and/or copper (II) chloride hydrate ($CuCl_2.2H_2O$).

Examples of the amine compound may include without limitation amine compounds having 1 or 2 nitrogen atoms, such as primary amines, secondary amines, tertiary amines, and combinations thereof.

In one embodiment, an amine compound represented by Formulas 3 to 8, or a combination thereof, may be used:

[Formula 3]

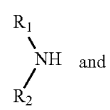

[Formula 4]

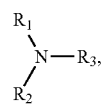

wherein $R_1$, $R_2$ and $R_3$ are the same or different and are each independently C1 to 10 alkyl;

[Formula 5]

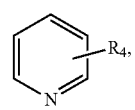

wherein $R_4$ is hydrogen, —$CH_3$, —$NH_2$, —$N(CH_3)_2$, —$NHCH_3$, or —$OCH_3$;

[Formula 6]

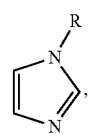

wherein R is hydrogen, C1 to C5 alkyl, or benzyl;

[Formula 7]

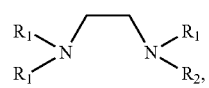

wherein $R_1$ and $R_2$ are the same or different and are each independently hydrogen or C1 to C5 alkyl; and

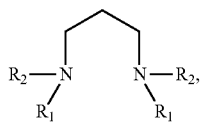

wherein $R_1$ and $R_2$ are the same or different and are each independently hydrogen or C1 to C5 alkyl.

In addition, amine compounds represented by the following formulas may be used:

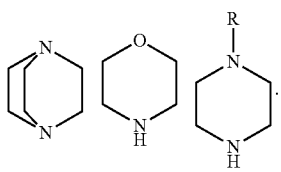

Examples of the amine compound may include without limitation n-propylamine, i-propylamine, n-butylamine, sec-butylamine, t-butylamine, n-pentylamine, n-hexylamine, cyclohexylamine, di-n-propylamine, di-n-butylamine, di-t-butylamine, di-t-hexylamine, tetramethylethylenediamine, morpholine, pyridine, 3-aminopyridine, 4-aminopyridine, 4-dimethylaminopyridine, di-t-butylethylenediamine, triethylamine, tri-n-propylamine, tri-n-butylamine, dimethyl-n-butylamine, dimethyl-n-pentylamine, diethyl-n-butylamine, tricyclohexylamine, α-collidine, γ-picoline, and the like, and combinations thereof. Further, amino alcohols and auxins may be used. These amine compounds may be used alone or as combinations thereof.

In addition, aliphatic amines may be used. Examples of aliphatic amines may include without limitation morpholine, N,N'-di-tert-butylethylene diamine, n-dibutylamine, methylimidazole, benzylimidazole, triethylamine, dimethylbutylamine, 4-dimethylaminopyridine, and the like, and combinations thereof. When aliphatic amines are used, polyarylene ether can be produced at a high yield.

The copper salt and the amine compound may be used in a weight ratio of about 1:2 to 1:200, for example about 1:5 to 1:20. When the copper salt and the amine compound are used in a weight ratio within this range, by-products such as DPQ (3,3',5,5'-tetramethyldiphenoquinone) can be minimized and the method can be cost efficient.

In one embodiment, a base containing a hydroxyl group (—OH) may be added in a mole ratio of the base containing a hydroxyl group to the copper salt of about 0 to 3 to generate a Cu—OH bond, resulting in increased catalytic activity. Examples of the base may include without limitation $NH_4OH$, $NMe_4OH$, $NEt_4OH$, NaOH, KOH, and the like, and combinations thereof, for example $NH_4OH$, NaOH, and KOH.

The dissolving agent may have a higher ability to dissolve the catalyst than water. That is, if the solubility of the catalyst in the dissolving agent is defined as Sd and the solubility of the catalyst in water is defined as Sw, a dissolving agent satisfying Sd>Sw is used.

Since the dissolving agent has a higher ability to dissolve the catalyst than water, the catalyst may not migrate to water generated during polymerization, and thus catalytic activity does not decrease.

In the present invention, the dissolving agent includes anisole. When anisole is employed as the dissolving agent, polyarylene ether can be produced at a high yield even when various catalysts are used due to high ability to dissolve such a catalytic combination. Further, it is easy to adjust heat of polymerization as compared with other solvents, and easy to deal with anisole due to the high flash point thereof.

Alternatively, the dissolving agent may be a mixture solvent of anisole and a non-solvent.

In one embodiment, the non-solvent is employed at a certain ratio to produce low-molecular-weight polyarylene ether at a high yield. The non-solvent is a solvent, other than anisole, which is insoluble in polyarylene ether and soluble in the catalyst. Specifically, a polar solvent may be used, for example, C1 to C4 alcohols, water, ketones, and the like, and combinations thereof. As a ketone, acetone may be used. When the mixture of the anisole and the non-solvent is used to precipitate polyarylene ether having a desired molecular weight, the molecular weight may not increase more and polyarylene ether having a low molecular weight which is not precipitated but is dissolved grows and is separated into precipitates through additional reaction. The precipitates may be collected at a high yield through simple filtration, and the catalyst and byproducts in the solution are easily eliminated.

In one embodiment, the weight ratio of the anisole to the non-solvent in the mixture can be about 7:3 to 3:7, for example about 6:4 to 4:6. When the weight ratio of anisole to non-solvent is within this range, polyarylene ether having a desired molecular weight can be produced at a high yield.

In some embodiments, the combination of the anisole and the non-solvent may include the anisole in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the anisole can be in a range from about any of the foregoing amounts to about any other of the foregoing amounts.

In some embodiments, the combination of the anisole and the non-solvent may include the non-solvent in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the non-solvent can be in a range from about any of the foregoing amounts to about any other of the foregoing amounts.

The reactant mixture may include the dissolving agent in an amount of about 70 to about 95 wt %, for example about 75 to about 90 wt %, based on the total weight of the reactant mixture. In some embodiments, the reactant mixture may include the dissolving agent in an amount of about 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the dissolving agent can be in a range from about any of the foregoing amounts to about any other of the foregoing amounts.

When the reactant mixture includes the dissolving agent in an amount within this range, excellent reaction stability can be secured and high yield can be obtained. As used herein, the term reactant mixture refers to a mixture of a monohydroxy aromatic compound, copper salt, amine, and a dissolving agent.

The reaction may be conducted at a temperature of about 10 to about 50° C., for example about 15 to about 45° C.

In one embodiment, an organic acid may be added to enhance precipitation and filtration processes in order to facilitate washing of the catalyst after polymerization.

The polyarylene ether prepared by the above method can include about 1 to about 3,000 ppm of anisole. Alternatively, the polyarylene ether can include about 1 to about 3,000 ppm of anisole and about 1 to about 3,000 ppm of a non-solvent. Further, the polyarylene ether may include about 1 to about 1,000 ppm of copper salt.

In one embodiment, the polyarylene ether may have a structure represented by Formula 2:

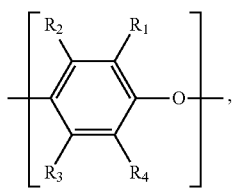

[Formula 2]

wherein:
R$_1$ is methyl (—CH$_3$), ethyl (—CH$_2$CH$_3$), or phenyl (-Ph or —C$_6$H$_5$); and
R$_2$, R$_3$ and R$_4$ are the same or different and are each independently hydrogen (—H), methyl (—CH$_3$), ethyl (—CH$_2$CH$_3$), or phenyl (-Ph or —C$_6$H$_5$).

Examples of the polyarylene ether may include without limitation poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene) ether, poly(2,6-diphenyl-1,4-phenylene)ether, a copolymer of poly(2,6-dimethyl-1,4-phenylene)ether and poly(2,3,6-trimethyl-1,4-phenylene)ether, a copolymer of poly(2,6-dimethyl-1,4-phenylene)ether and poly(2,3,5-triethyl-1,4-phenylene)ether, and the like, and combinations thereof.

The polyarylene ether may have a weight average molecular weight of about 15,000 to about 50,000 g/mol, for example about 20,000 to about 40,000 g/mol.

Alternatively, the polyarylene ether may have a weight average molecular weight of about 50,000 to about 300,000 g/mol, for example, about 60,000 to about 200,000 g/mol.

Further, the polyarylene ether may have an intrinsic viscosity (IV) of about 0.2 to 2.5, for example about 1.0 to 2.3, as measured in a chloroform solvent at 25° C.

Alternatively, the polyarylene ether may have an intrinsic viscosity (IV) of about 0.2 to 0.8, for example about 0.3 to 0.7, as measured in a chloroform solvent at 25° C.

Hereinafter, the present invention will be explained in more detail with reference to the following examples. These examples are provided for illustrative purposes only and are not to be in any way construed as limiting the present invention.

Details that are not included herein will be readily recognized and appreciated by those skilled in the art, and an explanation thereof is thus omitted.

EXAMPLES

Examples 1 to 9

Employment of Anisole as Dissolving Agent

Example 1

10 g of 2,6-dimethylphenol, 0.03 g of CuCl, and 150 ml of anisole are added to a 250 ml 3-neck round bottom flask and stirred. 5 g of di-n-butylamine is added to the reactant mixture while introducing oxygen gas thereto, thereby carrying out polymerization. During polymerization, the reactor is maintained between 25 to 35° C. using a cooling vat and a cooling jacket. When polymerization is completed, 5 g of citric acid is added, followed by precipitation in an excessive amount of methanol, filtration, washing with methanol twice, and drying in a vacuum oven at 100° C. for 12 hours.

Example 2

10 g of 2,6-dimethylphenol, 0.03 g of CuCl, 0.02 g of NaOH, and 150 ml of anisole are added to a 250 ml 3-neck round bottom flask and stirred to provide a reactant mixture, followed by the same remaining process steps as in Example 1.

Example 3

The same process as in Example 1 is conducted except that CuBr is used instead of CuCl.

Example 4

The same process as in Example 1 is conducted except that N,N,N',N'-tetramethyl ethylenediamine (TMEDA) is used instead of di-n-butylamine.

Example 5

The same process as in Example 1 is conducted except that morpholine is used instead of di-n-butylamine.

Example 6

The same process as in Example 1 is conducted except that pyridine is used instead of di-n-butylamine.

Example 7

The same process as in Example 1 is conducted except that DtBEDA (di-t-butylethylenediamine) is used instead of di-n-butylamine.

Example 8

The same process as in Example 1 is conducted except that N-methylimidazole is used instead of di-n-butylamine.

Example 9

0.03 g of CuCl, 5 g of di-n-butylamine, and 100 ml of anisole are added to a 250 ml 3-neck round bottom flask and stirred. A solution prepared by dissolving 10 g of 2,6-dimethylphenol in 50 ml of anisole is dropped into the reactant mixture for 20 minutes while introducing oxygen gas thereto, followed by the same remaining process steps as in Example 1.

Comparative Example 1

The same process as in Example 1 is conducted except that toluene is used as a polymerization solvent instead of anisole. The solution is opaque after reaction for 5 minutes. After 60 minutes, the solution became even more opaque and phase separation between the catalyst and water is observed on the bottom. As the catalyst transferred to the separated water layer, catalytic activity deteriorated, and thus yield significantly decreased.

Comparative Example 2

The same process as in Example 1 is conducted except that CHCl$_3$ is used as a polymerization solvent instead of anisole.

After polymerization for the same period of time, yield and molecular weight are evaluated, and the results are shown in Table 1.

TABLE 1

| | Example | | | | | |
|---|---|---|---|---|---|---|
| | 1 | 2 | 3 | 4 | 5 | 6 |
| DMP | 10 | 10 | 10 | 10 | 10 | 10 |
| CuCl | 0.03 | — | — | 0.03 | 0.03 | 0.03 |
| CuBr | — | 0.03 | 0.03 | — | — | — |
| NaOH | — | 0.02 | — | — | — | — |
| Amine (Amount) | di-n-butylamine (5 g) | di-n-butylamine (5 g) | di-n-butylamine (5 g) | TMEDA (5 g) | Morpholine (5 g) | Pyridine (5 g) |
| Dissolving agent | Anisole | Anisole | Anisole | Anisole | Anisole | Anisole |
| Polymerization solvent | — | — | — | — | — | — |
| Initiation of polymerization | Amine added | Amine added | Amine added | Amine added | Amine added | Amine added |
| Polymerization time | 2 hr | 2 hr | 2 hr | 2 hr | 2 hr | 2 hr |
| Yield | 91 | 93 | 90 | 93 | 84 | 86 |
| Molecular weight (Mw) | 49K | 43K | 41K | 66K | 54K | 110K |
| Phase separation | No | No | No | No | No | No |

| | Example | | | Comparative Example | |
|---|---|---|---|---|---|
| | 7 | 8 | 9 | 1 | 2 |
| DMP | 10 | 10 | 10 | 10 | 10 |
| CuCl | 0.03 | 0.03 | 0.03 | 0.03 | 0.03 |
| CuBr | — | — | — | — | — |
| NaOH | — | — | — | — | — |
| Amine (Amount) | DtBEDA (5 g) | N-Methylimidazole (5 g) | di-n-butylamine (5 g) | di-n-butylamine (5 g) | di-n-butylamine (5 g) |
| Dissolving agent | Anisole | Anisole | Anisole | — | — |
| Polymerization solvent | — | — | — | Toluene | CHCl3 |
| Initiation of polymerization | Amine added | Amine added | DMP added | Amine added | Amine added |
| Polymerization time | 2 hr | 2 hr | 2 hr | 2 hr | 2 hr |
| Yield | 95 | 88 | 93 | 48 | 88 |
| Molecular weight (Mw) | 95K | 63K | 38K | 9K | 88K |
| Phase separation | No | No | No | Yes | No |

(1) Yield

Yield=(Obtained PPE polymerized product/Used amount of DMP)×100

(2) Weight average molecular weight (GPC):

Weight average molecular weight is measured using a chloroform solvent under conditions shown in Table 2.

TABLE 2

| Pretreatment of sample | 1) 0.015 g of 0.01 g of sample is dissolved in 10 ml of CHCl3. |
|---|---|
| | 2) Dissolved sample is filtered using 0.45-μm syringe filter. |
| Equipment and conditions | System: Waters 515 HPLC pump, Waters 2414 RI detector, Waters 717 plus auto sampler |
| | Column: Shodex LF-804 2ea (8.0 I.D. × 300 mm) |
| | Flow rate (Ml/min): 1.0 |
| | Pressure (psi): 645 |
| | Solvent: CHCl$_3$ |
| | Input (μl): 200 |
| | Oven temperature: 40° C. |
| Standard samples | Standard: 8 types (SM-105, Polystyrene Shodex) |

Information about Standard

| NO | Mp |
|---|---|
| 1 | 2,210,000 |
| 2 | 591,000 |
| 3 | 205,000 |
| 4 | 55,000 |
| 5 | 30,200 |
| 6 | 13,900 |
| 7 | 3,370 |
| 8 | 1,310 |

Relative Calibration curve
Linear coefficient $R^2$ = 0.999

As show in Table 1, the products using anisole as a dissolving agent according to Examples 1, 2, 3, and 8 have an excellent yield as compared with the products using toluene and chloroform according to Comparative Examples 1 and 2. Further, according to an absorption peak at 421 nm of the UV-visible spectra, anisole produced ⅕ or less of DPQ (3,3', 5,5'-Tetramethyldiphenoquinone) as compared with chloroform.

Examples 10 to 17

Employment of Mixture as Dissolving Agent

Example 10

0.14 g of $CuCl_2 \cdot 2H_2O$, 0.29 g of N,N'-di-tert-butylethylenediamine (DtBEDA), and 2.54 g of triethylamine (TEA) are added to 90 ml of a mixture of a dissolving agent and a non-solvent (Anisole:MeOH=10:4) and stirred for 10 minutes. A solution prepared by dissolving 20 g of 2,6-DMP in 40 ml of a mixture (Anisole:MeOH=10:4) is added to the mixture solution for 20 minutes while supplying oxygen gas thereto (at 200 cc/min). Polymerization temperature is maintained between 25±2° C. using a cooler. After completion of addition, additional polymerization is conducted for 100 minutes. When polymerization is completed, the polymerized mixture is added to 0.5 L methanol (1 wt % citric acid), followed by precipitation, filtration, and collection. The collected product is washed twice using an excess of methanol and dried in a vacuum oven at 100° C. for 12 hours.

Example 11

The same process as in Example 10 is conducted using a different mixture of a dissolving agent and a non-solvent (Anisole:MeOH=9:5).

Example 12

The same process as in Example 10 is conducted using a different mixture of a dissolving agent and a non-solvent (Anisole:MeOH=8:6).

Example 13

The same process as in Example 10 is conducted using a different mixture of a dissolving agent and a non-solvent (Anisole:MeOH=7:7).

Example 14

The same process as in Example 10 is conducted except that a different amount of N,N'-di-tert-butylethylenediamine (0.14 g) and a different amount of TEA (2.52 g) are used.

Example 15

The same process as in Example 10 is conducted except that dibutylamine is used instead of triethylamine.

Example 16

The same process as in Example 10 is conducted except that morpholine is used instead of triethylamine.

Example 17

The same process as in Example 10 is conducted except that a mixture of anisole and methanol as a non-solvent at 110:30 is used.

Comparative Example 3

The same process as in Example 10 is conducted except that toluene is used as a polymerization solvent instead of a mixture of anisole and a non-solvent, CuCl is used as a source of Cu, and polymerization is carried out according to a composition listed in Table 3.

Comparative Example 4

The same process as in Example 1 is conducted except that a mixture of toluene and methanol at 120:30 is used as a polymerization solvent instead of a mixture of anisole and a non-solvent, CuCl is used as a source of Cu, and polymerization is carried out according to a composition listed in Table 3.

After polymerization for the same period of time, yield and molecular weight are evaluated, and the results are shown in Table 3.

TABLE 3

|  | Example | | | | | | | | Comparative Example | |
| --- | --- | --- | --- | --- | --- | --- | --- | --- | --- | --- |
|  | 10 | 11 | 12 | 13 | 14 | 15 | 16 | 17 | 3 | 4 |
| DMP (g) | 20 | 20 | 20 | 20 | 20 | 20 | 20 | 20 | 10 | 10 |
| $CuCl_2 \cdot 2H_2O$ (g) | 0.14 | 0.14 | 0.14 | 0.14 | 0.14 | 0.14 | 0.14 | — | — | — |
| CuCl (g) | — | — | — | — | — | — | — | — | 0.0324 | 0.0324 |
| DtBEDA (g) | 0.29 | 0.29 | 0.29 | 0.29 | 0.14 | 0.29 | 0.29 | 0.29 | 0.29 | 0.29 |
| TEA (g) | 2.54 | 2.54 | 2.54 | 2.54 | 1.52 | — | — | 2.54 | 2.54 | 2.54 |
| DBA (g) | — | — | — | — | — | 2.54 | — | — | — | — |
| Mo (g) | — | — | — | — | — | — | 2.54 | — | — | — |
| Anisole (ml) | 100 | 90 | 80 | 70 | 80 | 80 | 80 | 110 | — | — |
| MeOH (ml) | 40 | 50 | 60 | 70 | 60 | 60 | 60 | 30 | — | 30 |
| Toluene | — | — | — | — | — | — | — | — | 150 | 120 |
| $CHCl_3$ | — | — | — | — | — | — | — | — | — | — |

TABLE 3-continued

| | Example | | | | | | | | Comparative Example | |
|---|---|---|---|---|---|---|---|---|---|---|
| | 10 | 11 | 12 | 13 | 14 | 15 | 16 | 17 | 3 | 4 |
| Molecular weight (Mw) | 54.0K | 28.3K | 23.9K | 21.7K | 24.2K | 32.4K | 37.0K | 79.0K | 21.9K | 84.5K |
| Yield | 96 | 94 | 93 | 92 | 97 | 92 | 91 | 87 | 86 | 87 |

2,6-DMP = 2,6-Dimethylphenol,
DtBEDA = N,N'-Di-tert-butylethylenediamine,
TEA = Triethylamine,
Mo = Morpholine,
DBA = Dibuthylamine As shown in Table 3, the products using the mixture of anisole and the non-solvent according to Examples 10 to 17 have a superior yield as compared to the products according to Comparative Examples 3 and 4. In particular, Examples 10 to 16 produced polyarylene ether having a low molecular weight of 60 K or less.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. Polyarylene ether comprising about 1 to about 3,000 ppm of anisole.

2. The polyarylene ether of claim 1, wherein the polyarylene ether has a weight average molecular weight of about 15,000 to about 300,000 g/mol.

3. The polyarylene ether of claim 1, wherein the polyarylene ether further comprises about 1 to about 3,000 ppm of a non-solvent.

4. The polyarylene ether of claim 3, wherein the polyarylene ether has a weight average molecular weight of about 20,000 to about 70,000 g/mol.

5. The polyarylene ether of claim 3, wherein the non-solvent is a solvent insoluble in the polyarylene ether and soluble in a catalyst used in the preparation of the polyarylene ether.

6. The polyarylene ether of claim 3, wherein the non-solvent comprises a C1 to C4 alcohol, water, ketone, or a combination thereof.

7. The polyarylene ether of claim 1, wherein the polyarylene ether comprises a copper salt catalyst.

8. A method for preparing polyarylene ether, comprising:
reacting a monohydroxy aromatic compound in the presence of a catalyst, oxygen, and a dissolving agent,
wherein the dissolving agent comprises anisole.

9. The method of claim 8, wherein the catalyst comprises a copper salt.

10. The method of claim 8, wherein the catalyst comprises a complex catalyst including a copper salt and an amine compound.

11. The method of claim 8, wherein the monohydroxy aromatic compound is represented by Formula 1:

[Formula 1]

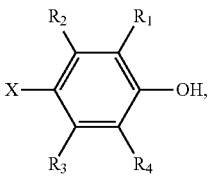

[Formula 1]

wherein X is hydrogen or halogen; and $R_1$, $R_2$, $R_3$ and $R_4$ are the same or different and are each independently hydrogen, halogen, C1 to C6 alkyl, or C6 to C12 aryl.

12. The method of claim 10, comprising:
preparing a reactant mixture by mixing a monohydroxy aromatic compound, copper salt, and a dissolving agent including anisole; and
adding an amine compound to the reactant mixture in the presence of oxygen.

13. The method of claim 10, comprising:
preparing a reactant mixture by mixing copper salt, an amine compound, and a dissolving agent including anisole; and
adding a monohydroxy aromatic compound to the reactant mixture in the presence of oxygen.

14. The method of claim 13, wherein the monohydroxy aromatic compound is dissolved in the dissolving agent including anisole and is then added to the reactant mixture in the presence of oxygen.

15. The method of claim 8, wherein the dissolving agent comprises a mixture solvent of anisole and a non-solvent.

16. The method of claim 15, wherein the non-solvent comprises a C1 to C4 alcohol, water, ketone, or a combination thereof.

17. The method of claim 15, wherein the anisole and the non-solvent are present in the mixture solvent in a weight ratio of about 7:3 to about 3:7.

18. The method of claim 12, wherein the reactant mixture includes the dissolving agent in an amount of about 70 to about 95 wt % based on the total weight of the reactant mixture.

19. The method of claim 13, wherein the reactant mixture includes the dissolving agent in an amount of about 70 to about 95 wt % based on the total weight of the reactant mixture.

20. The method of claim 12, further comprising adding a base having a hydroxyl group to the reactant mixture at a mole ratio of said base having a hydroxyl group to the copper salt of about 0 to 3.

21. The method of claim 13, further comprising adding a base having a hydroxyl group to the reactant mixture at a mole ratio of said base having a hydroxyl group to the copper salt of about 0 to 3.

22. The method of claim 10, wherein the amine compound comprises a primary amine, secondary amine, tertiary amine, or a combination thereof.

23. The method of claim 8, wherein solubility of the catalyst in the dissolving agent is higher than solubility of the catalyst in water.

* * * * *